June 19, 1951
H. WILMOT ET AL
2,557,624
APPARATUS FOR THE SURFACE TREATMENT
OF GIRDERS OR OTHER BARS
Filed April 16, 1948
8 Sheets-Sheet 4
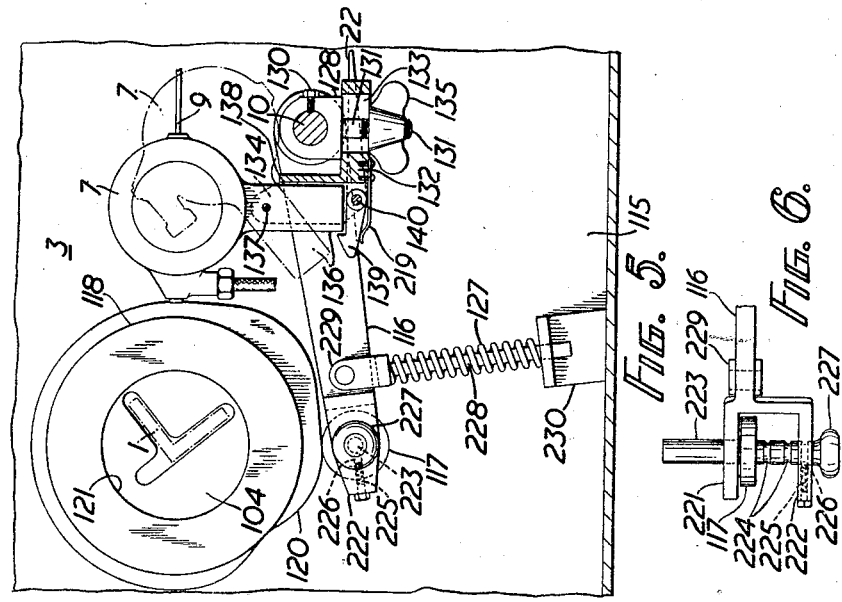
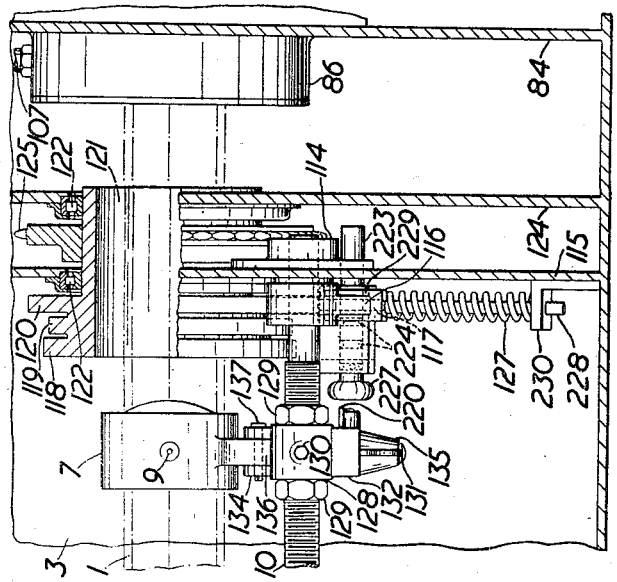
Inventors:
Harold Wilmot and
Charles St. Vincent Smith,
By Pierce, Scheffler & Parker,
Attorneys.

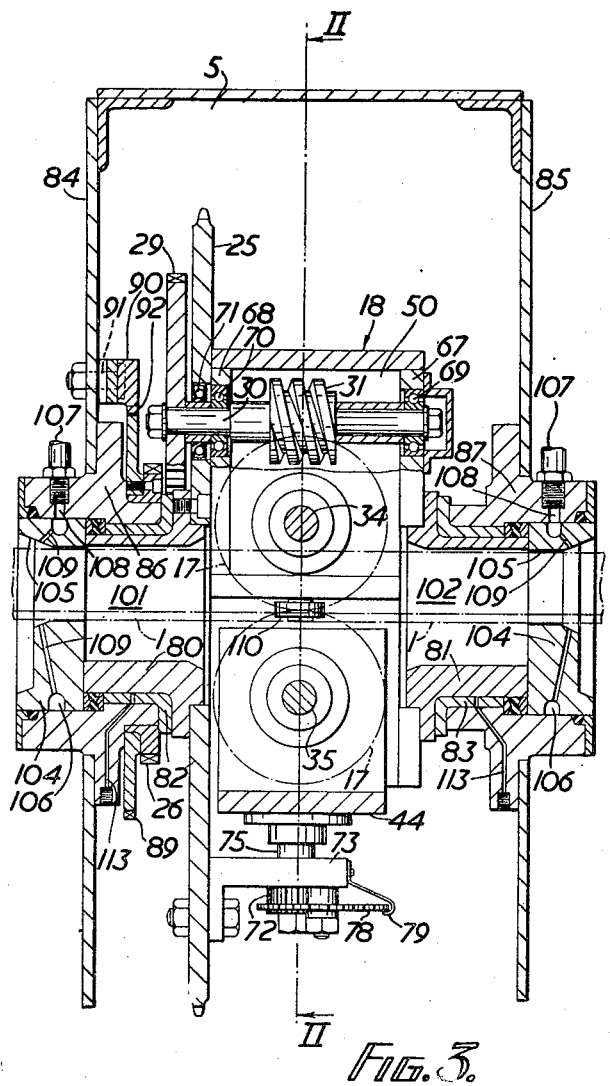

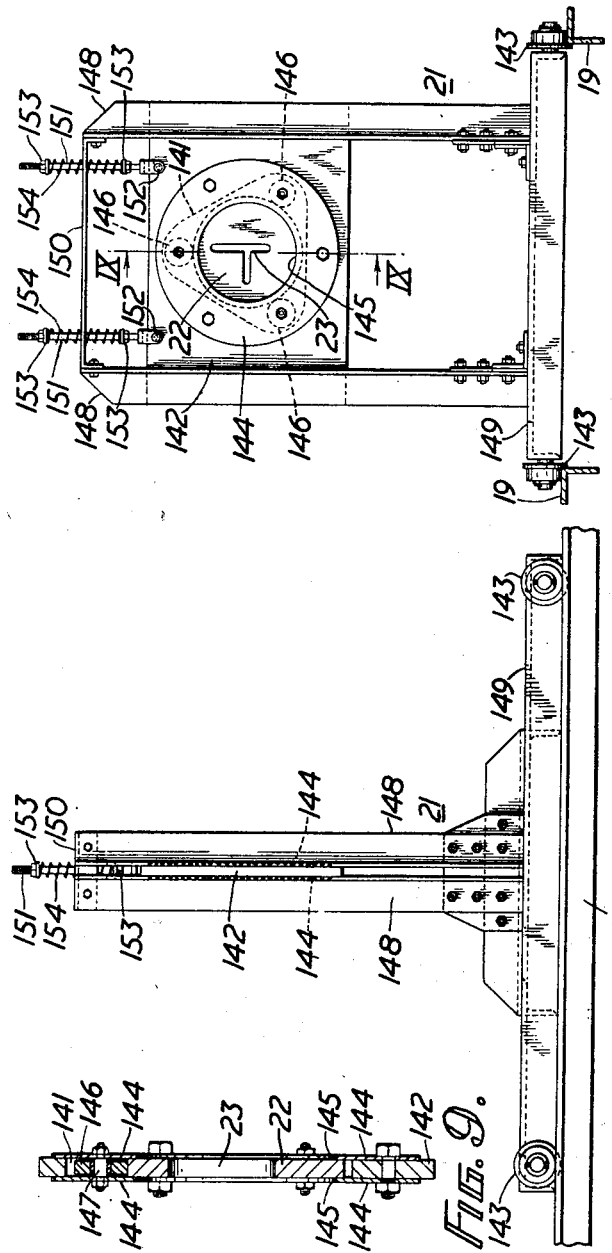

June 19, 1951 H. WILMOT ET AL 2,557,624
APPARATUS FOR THE SURFACE TREATMENT
OF GIRDERS OR OTHER BARS
Filed April 16, 1948 8 Sheets-Sheet 6
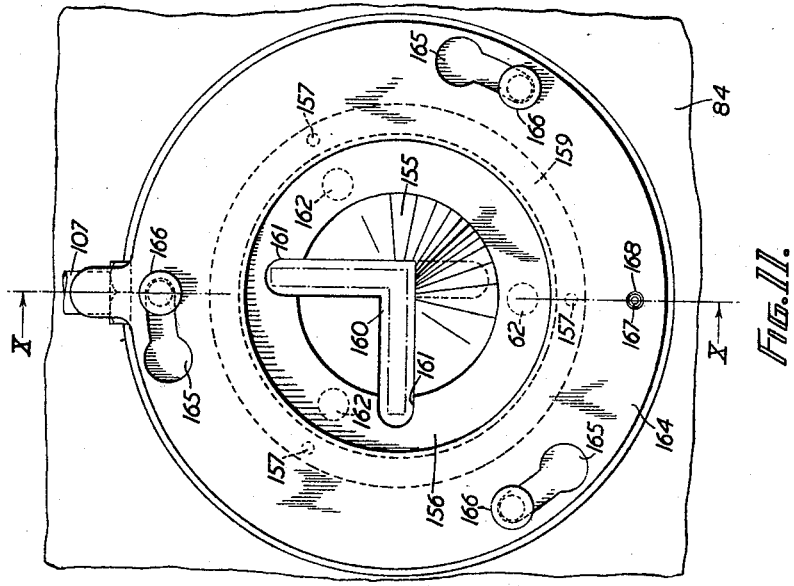
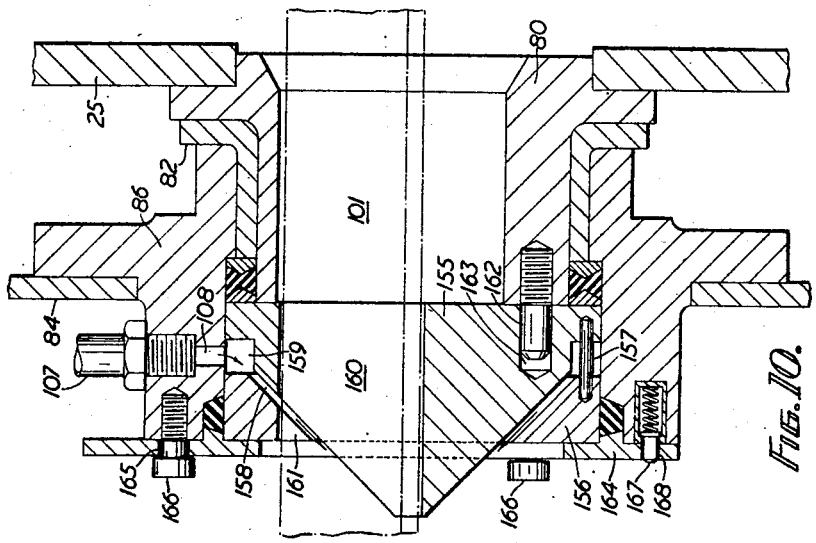
Inventors:
Harold Wilmot and
Charles St. Vincent Smith,
By: Pierce, Scheffler & Parker
Attorneys.

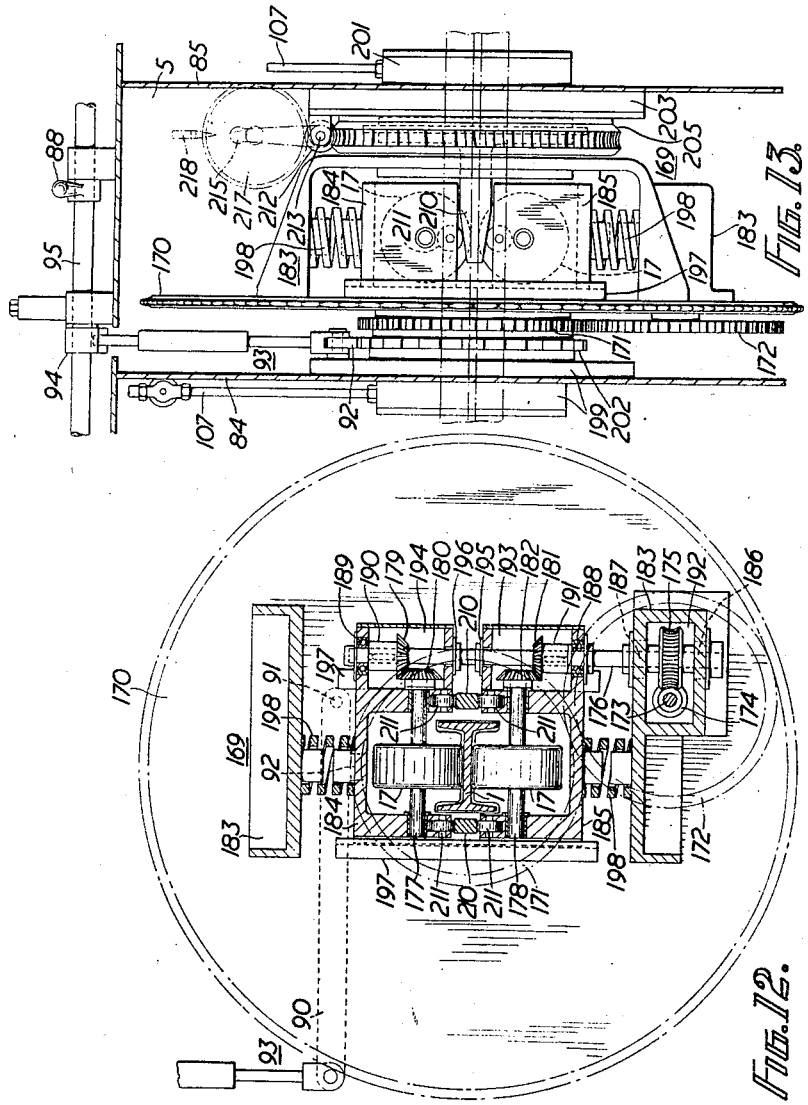

June 19, 1951  H. WILMOT ET AL  2,557,624
APPARATUS FOR THE SURFACE TREATMENT
OF GIRDERS OR OTHER BARS
Filed April 16, 1948  8 Sheets-Sheet 8
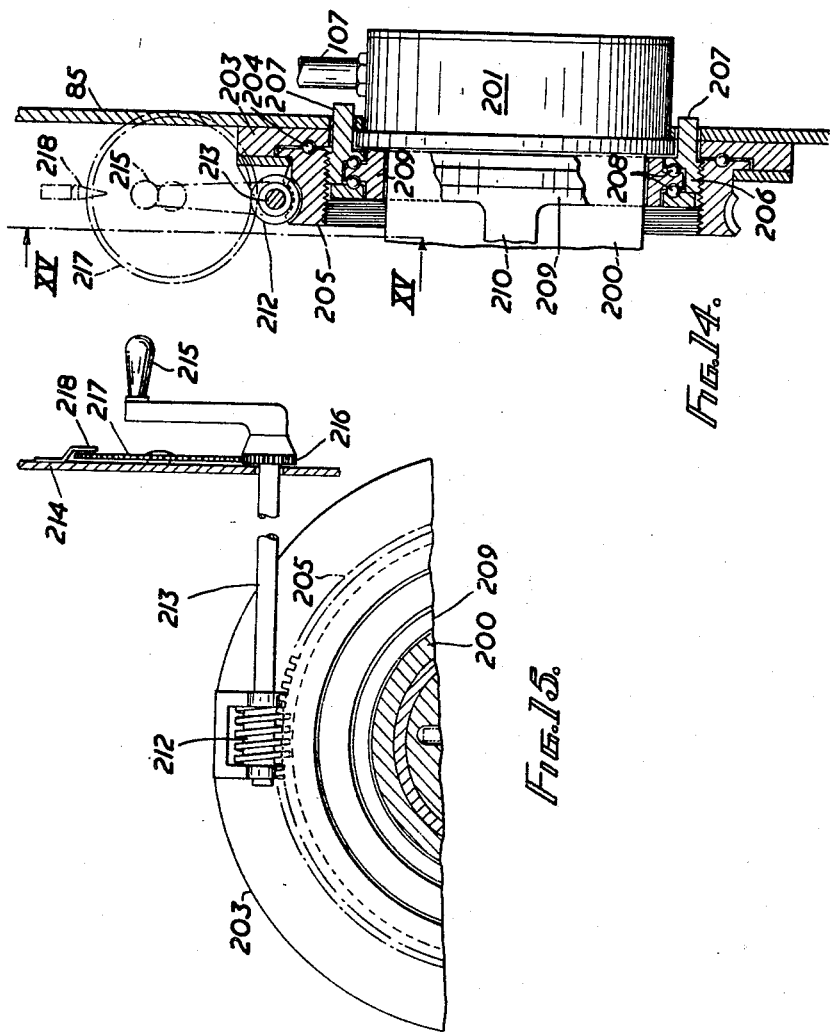
Inventors:
Harold Wilmot and
Charles St. Vincent Smith,
By: Pierce, Scheffler & Parker,
Attorneys.

Patented June 19, 1951

2,557,624

UNITED STATES PATENT OFFICE 2,557,624

APPARATUS FOR THE SURFACE TREATMENT OF GIRDERS OR OTHER BARS

Harold Wilmot, Surrey, and Charles St. Vincent Smith, Suffolk, England

Application April 16, 1948, Serial No. 21,446
In Great Britain February 5, 1947

20 Claims. (Cl. 91—32)

This invention relates to the surface treatment of girders or other bars. The invention has particular, but not exclusive, reference to the metallising (that is the coating with a thin layer of metal) of steel girders or other steel bars.

When girders or other bars are subject to surface treatment, it is customary first to clean them by bombarding them either by sand, shot or other abrasive blasting, in which the abrasive is propelled by compressed air, or by the so-called wheel abrator process in which the abrasive is propelled centrifugally by radial blades or a revolving wheel. It frequently happens, if the interval between this cleaning process and the subsequent metal treatment is prolonged, that owing to the nascent and granular nature of the exposed cleaned surface of the steel bar it is particularly liable to become rapidly tarnished or oxidized by the humidity of the atmosphere, and also this surface is such that oil and dirt readily adhere to it, thereby preventing the subsequent intimate and necessary contact of the thin metal layer given in the metallising treatment, and it is the main object of the present invention to prevent this possibility.

The invention in its broadest aspect consists in the arrangement that the bar is continuously passed longitudinally through successive regions where it is given the successive treatments simultaneously. Hitherto it has been the practice to clean each bar in a separate compartment and afterwards to carry it to another separate compartment for subsequent treatment and this process is therefore not continuous or under mechanical control.

In order that the invention may be the more clearly understood, a system in accordance therewith for metallising a steel bar, together with apparatus for carrying out said system, will now be described, reference being made to the accompanying drawings, wherein:

Figure 3 is a sectional front elevation of the same, the section being taken mainly on line III—III of Figure 2, but certain departures being made from this section line in the interests of clarity;

Figure 4 is a front elevation of a fragment of the metallising compartment illustrating one of the spray guns;

Figure 5 is an end elevation of the same looking from the left of Figure 4;

Figure 6 is a plan of a fragment of Figure 5;

Figure 7 is a front elevation of one of a number of trolleys comprised in the apparatus for supporting the steel bar;

Figure 8 is an end elevation of the same;

Figure 9 is a section to a larger scale on line IX—IX of Figure 8;

Figure 10 is a front elevation, shown in section on line X—X of Figure 10, illustrating an alternative to one of the parts of Figure 3;

Figure 11 is an end view of the same looking from the left of Figure 10;

Figure 12 is a sectional end elevation illustrating an alternative form of conveying unit;

Figure 13 is a front elevation of the same;

Figure 14 is a sectional view of a part of Figure 13;

Figure 15 is a fragmentary view on line XV—XV of Figure 14.

Figure 1:
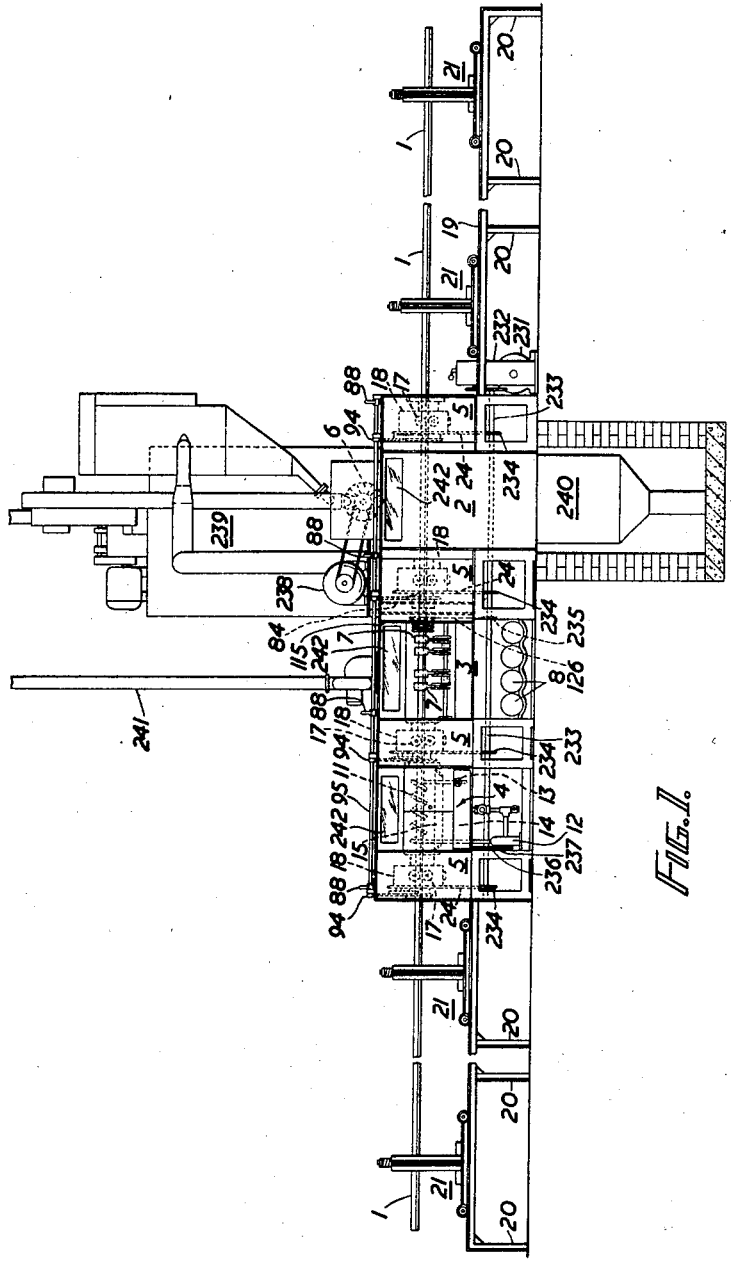
Figure 1 is a front elevation illustrating the general arrangement of the apparatus.

Referring first to Figures 1 to 9, the steel bar 1 (which may be of L, T, I or flat section, but which is shown as of L section) is passed longitudinally of its own axis, through three compartments 2, 3 and 4 in series. In the first compartment 2 it is subjected to a cleaning process consisting in bombardment with abrasive; in the second compartment 3 it is subjected to a metallising process whereby it is covered with a thin layer of the required metal, and in the third compartment 4 it is subjected to the so-called "passivating" process whereby the molecular interstices in the thin metal layer are filled with a chemical passivating liquid which associates, binds or marries the two metals in contact in such a manner as to render them impervious to the entry of corrosion producing elements.

Simultaneously with its longitudinal movement, said steel bar 1 is rotated about its axis so that its whole surface will be subjected evenly to the aforesaid three processes in sequence. Said bar 1 receives its longitudinal and rotary motion from a number of, in the present instance four, conveying units (Figures 2 and 3), the first of which is located on the inlet side of the cleaning compartment 2, the last of which is located on the outlet side of the passivating compartment 4, and the remaining two of which are located between the cleaning and metallising compartments 2 and 3 and between the metallising and passivating compartments 3 and 4. These conveying units are also encased in compartments (designated by the reference 5) and thus, in the particular arrangement being described, there are seven successive compartments 5, 2, 5, 3, 5, 4, 5.

These are constituted by a single elongated box-like casing as shown in Figure 1 with appropriate partitions therein.

In some cases an additional compartment may be employed for colour spraying, and a further conveyor unit would then also be required.

The cleaning process could consist of the usual sand or shot blasting process but, in the present instance, it consists of the so-called "wheel abrator" process in which the abrasive is projected against the bar 1 by centrifugal action, caused by rotation of the "wheel" 6.

The metallising process is carried out by means of a number of spray guns 7 of known type. These spray guns are supplied from compressed gas cylinders 8 outside the compartment, the gas preferably passing through regulators (not shown) outside the compartment. The metal is fed to the spray guns 7 in the form of wires 9 (Figures 4 and 5) and these are paid off from spools (not shown) which are also located outside the compartment. In the particular arrangement being described there are four spray guns 7 spaced at intervals along the steel bar 1, and, in order that the metallising process shall be applied to the whole surface of the bar, said spray guns are adapted to be oscillated continuously to and fro about the axis of a shaft 10 which is parallel to the bar 1, the oscillations of said spray guns synchronising with the rotary movement of the bar, and the time-angle characteristic of the oscillations being suited to the particular bar section employed.

The ambit of the invention is of course not confined to four guns since it is necessary that the combined width of the spiral band of metal projected on the bar in the described directions by all the spray guns shall in sum total be equal to the width of the shot blasted or cleaned band on the bar and the number of spray guns 7 required is determined by this relation.

The passivating process is carried out by means of a tube 11 which is coiled helically round, and at a convenient distance radially from, the rotating steel bar 1, and is provided with a series of perforations in the side towards the bar. The passivating chemical is pumped by means of a pump 12 into this tube 11 and is projected through the perforations on to the bar. Said chemical is pumped into the tube 11 at one end, and the other end is closed by means of a discharge valve 13 which opens to give egress to the chemical when the pressure in the tube exceeds a given value. The pump 12 supplies the chemical at a rate which ensures that the valve 13 shall be continuously just open, and thus the pressure within the tube 11 is maintained at said given value, and therefore the chemical is projected at a constant preselected rate. The position of the valve 13 at the egress end of the tube ensures that the pump 12 can run continuously without excessive back pressure whether the valve is open or not. The pump 12 is shown as disposed beneath the passivating chamber 4, and takes in from a tank 14 in the bottom of said chamber, and that portion of the chemical which is discharged through the discharge valve 13 drops back into said tank. The reference 15 designates a shallow funnel which guides the sprayed liquid back to the tank 14.

Each of the conveying units in the compartments 5 (Figures 2 and 3) comprises a pair of conveyor rollers 17 between which a web or flange of the steel bar 1 is adapted to pass longitudinally. These rollers 17 are positively driven and thus serve as the means of conveying the bar 1 longitudinally in the manner stated. In order that the bar 1 shall be simultaneously rotated about its own axis, the rollers 17 are mounted in a carrier structure 18 which rotates bodily about the axis of the bar. In practice the arrangement is such that the rotation of the carrier structure 18 about the axis of the bar 1 is effected by means of a prime mover, and the rotation of the conveyor rollers 17 about their own axes is effected through gearing on the carrier structure, in response to the rotation of said carrier structure, all as will be hereinafter described more particularly.

In the particular arrangement being described the set of compartments 5, 2, 5, 3, 5, 4, 5 is supported above the ground on longitudinal rails 19 which in turn are supported by legs 20. These rails extend at each end beyond the set of compartments, and trolleys 21, for supporting the extending ends of the steel bar 1, run on the extending portions of these rails. Each of these trolleys 21 carries a supporting portion or bearing 22 which has an aperture 23 shaped to fit all sections of the steel bar and which is rotatable about the axis of said steel bar. It will be understood that, as the bar 1 is fed the trolleys 21 run along the rails 19 and simultaneously the bearings 22 rotate with the bar.

Describing now, more particularly, the operation of the various parts of the apparatus, and first the operation of the conveying units, the rotation of the carrier structure 18 is effected through a chain drive 24 (Figure 1) on a large rotatable sprocket wheel 25 (Figures 2 and 3) which is comprised in rigid relation with said carrier structure 18. Coaxial with said sprocket wheel, and fairly close thereto, is a relatively small fixed sun gear wheel 26. Rotatably mounted on said sprocket wheel 25 on one side thereof is a planet gear wheel 27 in mesh with said fixed sun gear wheel 26, and said planet gear wheel 27 has a small pinion 28 in rigid relation with it which is in mesh with another pinion 29 mounted fast on a worm shaft 30 which is rotatably mounted on the carrier structure 18. It will be seen that this worm shaft 30 is parallel to the axis of the steel bar 1.

This worm shaft 30 has a worm 31 fast on it which is in mesh with a worm wheel 32 fast on a common drive shaft 33 which is of course at right angles to the worm shaft 30 and is also at right angles to, and in the same plane as, the axes of the two conveyor rollers 17. These rollers 17 are mounted fast on respective shafts 34 and 35 which are carried by the carrier structure 18, and said shafts are driven from the common drive shaft 33 through respective pairs of bevel gears 36, 37 and 38, 39.

The conveyor rollers 17 are spring biased towards one another in order that they shall grip firmly the flange or web of the steel bar 1.

To enable the rollers 17 to be thus biased towards one another, one of said rollers has its shaft 35 bearing in an auxiliary portion 40 of the carrier structure 18 which auxiliary portion is slidable relative to the main portion in the appropriate direction, which direction, it will be seen, is longitudinal with respect to the common drive shaft 33. Said common drive shaft 33 bears at one end in ball bearings 41 in the main portion of the carrier structure 18, and at the other end in ball bearings 42 in said auxiliary portion 40, and, to enable said auxiliary portion to be adjusted relative to said main portion, the inner race 43 of the ball bearings 42 is in splined relation on said common drive shaft 33 so that it can move longitudinally with respect thereto. The bevel gear 38 on said common drive shaft 33, which is in mesh with the bevel gear 39 on the roller shaft 35 which is carried by said auxiliary portion 40 of the carrier structure, must also be movable, with said auxiliary portion, longitudinally of said common drive shaft 33. Therefore said bevel gear wheel 38 is also in splined relation on said common drive shaft 33.

For mounting the auxiliary portion 40 slidably relatively to the main portion of the carrier structure 18, and biasing it relative to said main portion, said auxiliary portion comprises a base plate 44 which, at its two ends, lies close and parallel to two flanges 45 on said main portion. A bolt 46 passes through registering holes in each flange 45 and the adjacent base plate 44. Nuts 48 are screwed on said bolts 46 beyond said base plate 44, and said base plate is biased towards the flanges by means of heavy helical springs on the respective bolts 47, in compression between the surfaces of the flanges 45 remote from said base plate and nuts 49 on said bolts.

The general form of the carrier structure 18 will be clear from the drawing and it will be seen that the main portion of said carrier structure comprises a box-like enclosure 50 which houses the worm 31, worm wheel 32 and bevel gears 36 and 37 and protects these parts from dust and the like. The auxiliary portion 40 of said carrier structure comprises a box-like enclosure 51 which houses the bevel gears 38 and 39 and likewise protects them from dust.

The ball bearings 41 for one end of the drive shaft 33 are in the wall 52 of the enclosure 50 remote from the enclosure 51, and the ball bearings 42 for the other end of said drive shaft are in a portion of the base plate 44 which forms the wall of the enclosure 51 remote from the enclosure 50. Said shaft 33 also passes through the adjacent walls 53 and 54 of said enclosures, and, in order to prevent dust from entering the enclosures through the openings in these walls 53 and 54 through which the shaft 33 passes, a sleeve 55, loosely surrounding said shaft, is secured tight in the opening in the wall 54 and extends into the opening in the wall 53. Said sleeve 55 is sealed in this latter opening by means of a seal 56 which permits of longitudinal sliding of said sleeve within said opening.

A spacing sleeve 57 is provided on the shaft 33 between the bevel gear 38 and the inner race 43 of the ball bearing 42, and another sleeve 58 is provided between said bevel gear and said wall 54. Thus when the auxiliary portion 40 of the carrier structure moves axially relatively to the shaft 33, the bevel gear 38 is constrained to move with it so as to remain in mesh with the bevel gear 39. At the same time the sleeve 55 also moves with said auxiliary portion 40 within the hole in the wall 50.

Dealing now with certain details of the conveying unit, the shaft 34 of one of the rollers 17 runs at one end in a ball bearing 59 in a wall 60 of the main portion of the carrier structure outside the enclosure 50. Said shaft 34 also runs in a ball bearing 61 in a wall 62 of said enclosure 50, the bevel gear 37 being mounted on the end of said shaft within said enclosure. The shaft 35 of the other roller 17 runs at one end in a ball bearing 63 in a wall 64 of the auxiliary portion 40 of the conveying unit outside the enclosure 51. Said shaft 35 also runs in a ball bearing 65 in a wall 66 of said enclosure 51, the bevel gear 39 being mounted on the end of said shaft within said enclosure.

The worm shaft 30 passes through opposite walls 67 and 68 of the enclosure 50 and also through the sprocket 25, and it runs in three ball bearings 69, 70 and 71 in said two walls and sprocket respectively. The pinion 29 is mounted on said shaft 30 close to the face of said sprocket remote from said enclosure 50. The planet gear 27 and pinion 28 (which are not seen in Figure 3) are rotatably mounted on the same face of said sprocket in any suitable way.

Means are provided to enable a gap to remain between the conveyor rollers 17 when there is no steel bar 1 between them, which means are operable to adjust said gap to suit different thicknesses of bar. This is necessary because if the rollers 17 were normally held by the biasing springs 47 in full contact with each other, they would refuse to receive the leading end of the bar 1, particularly if it was of considerable thickness, and, if said rollers were normally sufficiently wide apart to receive the leading end of bars of maximum thickness they would be too wide apart to engage bars of minimum thickness at all.

In accordance with the present arrangement the limit to which the roller 17 on the shaft 35 can be pulled towards the other roller 17 is determined by the abutment of a head 72 carried by the auxiliary portion 40 of the carrier structure against a stop plate 73 carried by the sprocket 25, that is to say by the main portion of the carrier structure, said head 72 being adjustable to vary said limit. More particularly the stop plate 73, which is in a plane at right angles to the direction of movement of said auxiliary portion 40, has a hole 74 through it, and the base plate 44 of said auxiliary portion has rigidly mounted on it a post 75 which projects into said hole. Said post has a screw threaded bore hole 76 in it parallel to the direction of movement of said auxiliary portion 40, and the head 72, which is on the side of the plate 73 opposite to the post 75, has a screwed shank 77 projecting axially from it which passes through said hole 74 and makes screwed engagement in the bore hole 76. The head 72 is too large to pass through said hole 74 and abuts against the plate 73, thereby limiting the travel of the said auxiliary portion 40. It will be seen that the limit is varied by rotating the head 72 and thereby variably screwing the shank 77 into the bore hole 76.

For rotating said head 72, it is formed with circumferential teeth which are in mesh with the teeth of a larger gear wheel 78 rotatably mounted on said stop plate 73. This gear 78 is adapted to be rotated by hand and has its face calibrated so as to read against a pointer 79 mounted on said stop plate 73.

The calibrations on the gear 78 are not in terms of the width of the minimum clearance between the rollers but in terms of the thickness of the web or flange which is to be taken between the rollers, and which is of course greater than the said minimum clearance by a suitable amount of, say, an eighth of an inch.

For rotatably mounting the sprocket 25 together with the carrier structure 18, the sprocket-carrier-structure unit is provided with trunnions 80 and 81 which bear in bearings 82 and 83 in the partitions 84 and 85 which define the compartment 5 in which the conveying unit is enclosed. The trunnions 80 and 81 are rigidly secured respectively to the sprocket 25 and a wall of the main portion of the carrier structure 18, and the bearings 82 and 83 are mounted in bored bosses 86 and 87 which are secured in the partitions 84 and 85.

It will be seen that the fixed sun wheel 26 is mounted on the boss 86. A control lever 88 is provided adapted to be operated for freeing said sun gear 26 and enabling it to rotate on said boss 86. It will be seen that, when said sun gear 26 is thus freed, it will rotate with the sprocket 25 and carrier structure 18, and the transmission train from said sun gear to the conveyor rollers 17 will accordingly cease to operate, and said conveyor rollers will cease to rotate about their axes. Thus the bar 1 under treatment, though it will continue to be rotated about its axis, will cease to be fed longitudinally. Such a control lever 88 may be provided only in connection with the first of the conveying units, where it is useful in enabling the end of the steel bar 1 to be properly presented to the rollers 17 before the latter rotate for taking up the feed. If such a control lever 88 is provided for all of the conveying units, so that the longitudinal feed of the bar 1 may be stopped at any moment, it is obviously important that the several control levers shall be operated in unison from a single master control element.

More particularly the sun wheel 26 is rotatably mounted on said boss 86 and it has rigid with it a ratchet wheel 89. Just above the ratchet wheel 89 is provided a lever 90 which pivots about a fixed pin 91 mounted on the partition 84. This lever 90 carries a projection 92. Said lever 90 is coupled, by means of a link 93 to a crank 94 on a rotatable shaft 95 on which the control lever 88 is rigidly mounted. In the position of the control lever 88 shown, the link 93 acts as a strut to press the lever 90 so that its projection 92 engages between teeth of the ratchet wheel 89 and thereby lock said ratchet wheel, and therefore said sun wheel 26 against rotation. This is the normal position at which the bar 1 will be both rotated and conveyed. When, however, the control lever 88 is pushed down, the link 93 will act as a tie and will lift the lever so that the projection 92 disengages the ratchet wheel 89. Said ratchet wheel and therefore the sun wheel 26 are now free to rotate, and, as heretofore described, the bar 1 will be rotated but not conveyed.

In the arrangement illustrated in Figure 1 all the conveying units are subject to this control by control levers 88. It will be seen that a common shaft 95 is provided extending longitudinally over all the compartments. This shaft has the several cranks 94 mounted on it at the appropriate positions above the respective compartments 5 so that the conveying units must all be controlled in unison as heretofore stated. The shaft also has individual control levers 88 mounted on it adjacent the respective compartments 5 so that the control can be effected from the locality of any of said compartments.

Returning again to Figure 2 it will be seen that the link 93 consists of two telescoping parts 96 and 97 the inner (96) of which carries a collar 98 which engages with a shoulder 99 in the outer part 97 to limit the outward movement of the parts relative to each other. A coil spring 100 embracing the inner part and located within the outer part is in compression between said collar 98 and another shoulder 101 within said outer part in such a way as to bias the parts to their outward limit relative to each other. Thus when said link 93 acts as a tie it is not yieldable, but, when it acts as a skirt it is capable of yielding compressively, and thus the extension 92 can be pressed firmly against the ratchet wheel 89 without danger of any of the parts being strained. It will be seen that the shaft 95 is yieldably retained at each of its two positions by engagement of a spring loaded ball 111 in recesses 112 in said shaft.

It will have been understood that the trunnions 80 and 81 must be hollow so as to admit the passage of the steel shaft 1. In practice, the holes 102 and 103 through said trunnions 80 and 81 are of a suitable section which will give passage to steel bar of all sections. For example said holes could be of a T section so as to be able to give passage to either flat steel bar or to steel bar of T section or L section. Alternatively the holes could be of I section so as to give passage to bars of I section or of rectangular channel section.

Means are provided for producing an air flow for preventing matter in any of the treatment compartments 2, 3 or 4 from flowing through said trunnions 80 or 81 into any of the conveying-unit compartments 5.

To this end a detachable die 104 is secured to the outer end of each trunnion 80 and 81. This die 104 is specially adapted to the particular steel bar 1 being treated, and has a passageway 105 through it, for giving passage to said steel bar, which is of a section which corresponds to the section of the steel bar with only a small clearance all round. The outer periphery of this die 104 is cylindrical and said die bears in the same boss 86 or 87 in which the trunnions 80 or 81 bears. The said outer periphery of said die is formed with a circumferential groove 106, and compressed air is adapted to be supplied to said groove by way of a pipe 107 and a port 108 through the said boss 86 or 87 and, leading from said groove 106 to the passageway 105 through the die are a number of air holes 109 which conduct the compressed air into the said passageway. These air holes lead to different points round the passageway 105 and will therefore be of different length depending on the section of said passageway. They are all inclined in such a direction that they emerge near the outer end of said passageway 105, that is the end which opens to the treatment compartment 2, 3 or 4 next to the compartment 5 which encloses the conveying unit. Moreover, at said outer end the passageway 105 diverges slightly as shown or in other words its clearance round the bar 1 increases, and the air holes 109 emerge at the divergent portion of said passageway.

It will be seen from the above that a stream of air will be continuously emerging from the outer end of the passageway 105 through the die, around the steel bar 1, and flowing into the treatment compartment next to the compartment 5 enclosing the conveying unit, or, in the case of the outer ends of the two outer compartments 5 (if such an arrangement is there provided), flowing to the outer atmosphere. This has the important effect of preventing any matter, either from the outer atmosphere or from the adjacent treatment compartment or compartments, from finding its way into a conveying unit compartment 5. Thus no dust from the outer atmosphere or sand shot or other abrasive from the cleaning compartment 2 or metal from the metallising compartment 3 or chemical from the passivating compartment 4 can find its way into any of the conveying unit compartments 5.

In other words nothing can pass from any treatment compartment to any conveying unit compartment, and therefore nothing can pass from any treatment to any other treatment compartment.

The reference 110 designates a roller mounted on the main portion of the carrier structure 18 for engaging and guiding the bar 1 at the point where it passes between the feed rollers 17. The reference 113 designates lubricating ducts.

Decribing now, with reference to Figures 4, 5 and 6, the means for rocking the spray guns 7 about the axis of the shaft 10, said spray guns normally are rigid on said shaft 10. Said shaft 10 at one end bears in a bearing 114 in a vertical partition or part partition 115 provided within the compartment 3. At its other end said shaft bears in a similar bearing in another similar partition (not shown).

Fast on said shaft 10 is a lever 116 which, at its end remote from said shaft, carries a roller 117, and this roller is capable of being adjusted axially so as to engage any one of a number of circumferential cams 118, 119 and 120 integral with and axially spaced on, a sleeve 121 mounted, so as to rotate, about the axis of rotation of the bar 1, in bearings 122 and 123, the former of which is in the said partition or part partition 115, and the latter of which is in another partition or part partition 124 within the compartment 3.

Said sleeve 121 carries a sprocket 125 and is driven by means of a chain drive 126 on said sprocket so as to rotate in synchronism with the rotating bar 1. Said bar 1 passes through the bore of said sleeve.

Said lever 116 is biased by means of a spring 127 so that the roller 117 engages the periphery of whichever cam it is adjusted to be in line with. Thus, as the sleeve 121 rotates in synchronism with the bar 1, the operative cam 118, 119 or 120 causes the lever 116 to rock the shaft 10 and therefore the spray guns 7. The several cams are contoured so as to suit the different sections of the bar 1 which may be employed. The roller 117 is engaged with the cam which is suited to the particular bar 1 being employed, and the spray guns 7 will then be given a rock whose time-angle characteristic suits the said bar 1. The actual profile of the cams may be determined empirically.

More particularly, for mounting each spray gun 7 on the shaft 10, a block 128 with a hole in it is slid on to said shaft 10 and is adjustably located thereon by means of two nuts 129 screwed on said shaft on either side of said block. Said block 128 is also positively secured against rotation on said shaft by means of a small screw 130. Said block 128 has a screwed post 131 projecting from it radially with respect to the shaft 10. A bracket is provided consisting of a base portion 132 with a slot 133 through it, and, at one end a pair of parallel lugs 134 upstanding from it. The slot 133 is threaded on the post 131, and a butterfly nut 135 is screwed on the projecting end of said post thereby clamping said base portion 132 hard against said block 128. The slot enables the position of the base portion 132 relative to the shaft 10 to be adjusted.

The spray gun 7 has a downwardly depending lug 136 which is pivoted between the lugs 134 by means of a pivot pin 137 passing through said lugs 134 and said lug 136. A web 138 is formed extending transversely between the lugs 134, and the lug 136 abuts against said web 138 for limitation of the pivotal movement of the former in one direction. For limiting the pivotal movement of said lug 136 in the other direction, and thereby retaining said lug 136, and therefore the spray gun 7 against rotation about the pin 137, a catch 139 is provided. This catch is fast on a small rotatable shaft 140 which extends transversely between the lugs 134 at their lower ends and it is upwardly biased by means of a leaf spring 219 so that, when the spray gun 7 is turned about the pin 137 to the normal position (shown in full lines in Figure 5) at which the lug 136 abuts against the web 138, said catch 139 will engage the lower end of said lug 136 to prevent return rotation of said spray gun. The spray gun is now at its operative position, and it will be appreciated that it is in rigid relation to the shaft 10 and will therefore rock with said shaft.

On one end of the shaft 140 a finger lever 220 is rigidly mounted, and by this lever said shaft can be rocked so as to disengage the catch 139 from the lug 136. The spray gun can then be tilted back to the position shown in chain dotted lines in Figure 5, to enable, for instance, its nozzle to be cleaned.

For enabling the roller 117 to be adjusted axially as stated, the lever 116 is formed at its end with two spaced branches 221 and 222. A pin 223 passes through these branches and said roller 117 is mounted on said pin between said branches. Said roller is rotatable, but not axially movable, on said pin.

Said pin 223 has three spaced circumferential grooves 224 around it and the branch 222 has a longitudinal bore hole in it, in which is located a compression spring 225 and a plunger 226 controlled thereby. The compression spring 225 biases the plunger 226 against the pin 223, and, according to the longitudinal position of said pin, the plunger is pressed into one or other of the grooves 224 and thereby yieldably retains the pin against longitudinal movement. The pin is provided with a head 227, and by pulling and pushing said head, said pin can be shifted longitudinally between the several positions at which the plunger 226 engages the grooves 224, and said pin will be yieldingly retained against inadvertent displacement. These several positions correspond to the positions at which the roller 117 engages the several cams 118, 119 and 120, and therefore, when a bar 1 of fresh section is to be treated all that is necessary, in order to get the appropriate rocking movement to the spray guns 7 is to push or pull the head 227 until the roller 117 is set for engagement with the appropriate cam.

For biasing the lever 116, the latter has a rod 228 pivoted to it by means of a shoe 229. The rod passes through a hole in a fixed plate 230 and the spring 127 is coiled about said rod and is in compression between said shoe 229 and said plate 230.

Describing now with reference to Figures 7, 8 and 9 the structural details of the trolleys 21, the bearing portion 22 in which the aperture 23 is formed consists of a circular bearing plate which is mounted so as to rotate in an aperture 141 in a rectangular carrier plate 142, said bearing plate being coplanar with said carrier plate. The trolley as a whole has wheels 143 by which it runs on the rails 19, and the carrier plate 142 is mounted on said trolley in a vertical plane at right angles to said rails, in such a way as to be capable of a small yielding movement in its own plane. Thus as the bar 1 advances, the trolley as a whole moves with it along the rails 19, the bearing plate at the same time rotating with said bar, and, if there should be any lack of straightness in said bar, the unit comprising the carrier plate and the bearing plate will adjust itself in its own plane accordingly.

More particularly two thin retaining plates 144 are fixedly mounted flat against each side of the carrier plate 142, and said retaining plates have circular apertures 145 therein which are concentric with, and of slightly less diameter than, the bearing plate 22. The periphery of said bearing plate is engaged by three rollers 146 which are mounted in the aperture 141 and rotate on dead shafts 147 which extend between the retaining plates 144. The aperture 141 is conveniently made triangular so as to accommodate said rollers 146 as shown.

Thus the bearing plate 22 rotates freely between the rollers, and sideways movement thereof is prevented by the overlapping retaining plates 144.

Said carrier plate 142 is mounted with each of its side edges freely located between a pair of vertical angle-section members 148 which are mounted upon a base structure 149 which carries the wheels 143. At their upper end the two pairs of angle-section members 148 are bridged by means of a horizontal bridging plate 150. Two vertical rods 151 pass through holes in said bridging plate 150, and are pivotally secured at 152 at their lower ends to the upper edge of the carrier plate 142. Each of these rods 151 carries adjustable collars 153 above and below said bridging plate 150, and springs 154 coiled about each rod above and below the plate 150 are in compression between the respective collars 153 and said bridging plate 150. Thus said carrier plate 142 takes up a normal vertical position depending upon the springs 154 and the adjustment of the collars 153, and is capable of yieldingly moving either up or down from this normal position. At the same time, owing to the pivotal connections 152 between the rods 151 and said carrier plate 142, the latter can also move to a limited extent horizontally in either direction. It will have been understood that the upright members 148 guide the carrier plate 142 and confine its movement to movement in its own plane.

Figure 2:
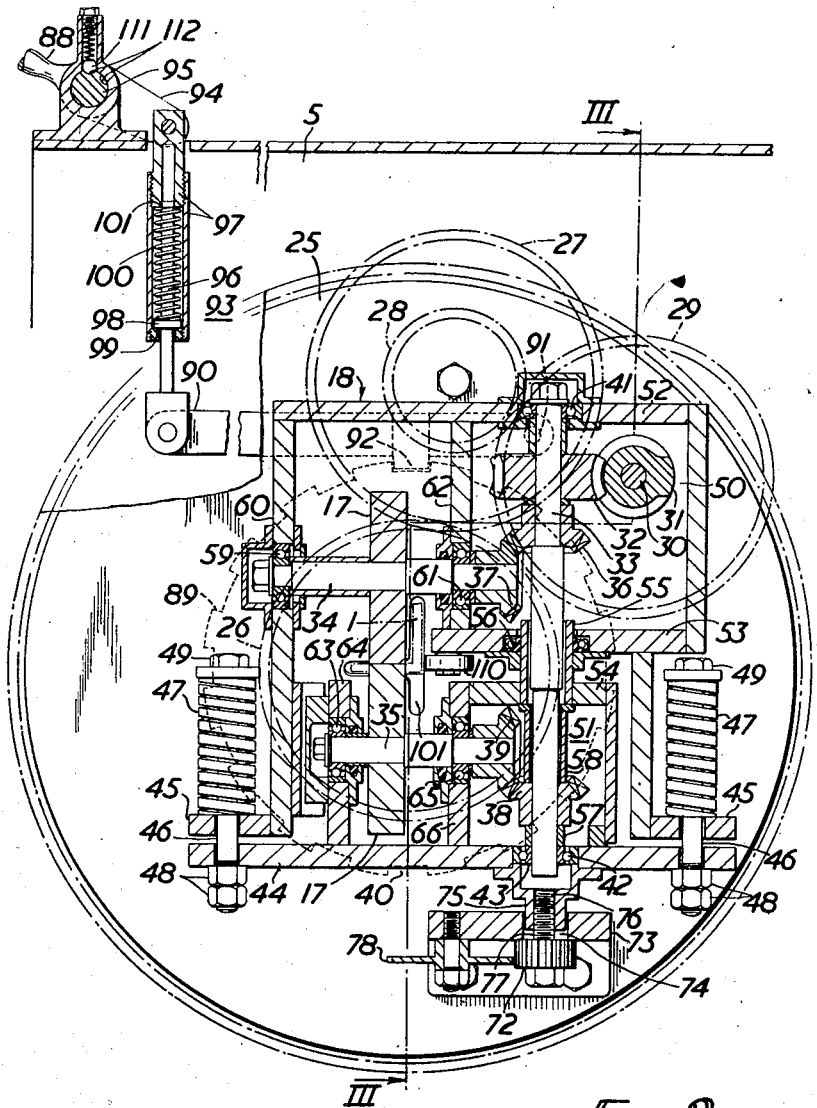
Figure 2 is a sectional end elevation on line II—II of Figure 3 illustrating one of a number of conveying units comprised in the apparatus by which the steel bar is conveyed through the several compartments.

Referring now to Figures 10 and 11, these figures illustrate an alternative to the air flow system described with reference to Figures 2 and 3. The parts designated in Figures 10 and 11 by the references 25, 80, 82, 84, 86, 101, 107 and 108 are the same as the similarly designated parts of Figures 2 and 3. The primary difference between the system of Figures 10 and 11 and that of Figures 2 and 3 is that in place of the die 104 of Figure 3, a composite die is employed in Figures 10 and 11 which consist of two parts 155 and 156. The inner part 155 is in the form of a cone which fits coaxially in the bore of the boss 86 with its base end abutting against the end of the trunnion 80 as shown. The outer part 156 consists of a ring whose outer periphery is cylindrical and fits into the bore of the boss 86 in front of the part 155 as shown, and whose inner periphery is coned in a manner corresponding to the conical periphery of said part 155. The outer part 156 is spaced from the inner part 155 by means of spacing pegs 157 in such a way that a narrow conical clearance 158 exists between the external conical surface of the part 155 and the internal conical surface of the part 156. The two parts 155 and 156 are formed, as will be clear from the drawing, in such a way that this conical clearance, where it approaches the outer periphery of said two parts, widens so as to form a circular groove 159. The port 108 communicates with this groove 159 and it will therefore be seen that the air flowing down the pipe 107 flows through said port 108 into said groove 159 and then flows convergently through said clearance 158. The composite die 155, 156 will of course have an aperture through it corresponding to the section of the bar 1 in the same way as in the system of Figures 2 and 3, and this aperture is partially (at 160) in the part 155, and partially (at 161) in the part 156. It will be seen that the convergent conical curtain of high velocity air will cut across this aperture.

This convergent conical curtain of high velocity air prevents any matter passing into the aperture 160, 161 from the treatment chamber 2, 3 or 4 towards the conveying-unit chamber 5. In particular, when the treatment chamber is the wheel-abrator chamber 2, the conical curtain of air resists the bombardment of the shot and prevents the same from entering the aperture 160, 161.

In construction, it will be seen that the die part 155 is correctly located relative to the trunnion 80 by means of a number of pegs 162 mounted on the end of said trunnion engaging in corresponding holes 163 formed in the base surface of said die part 155. These pegs form the coupling by which said trunnion rotates said die part. The aforesaid spacing pegs 157, whose ends engage in holes in the parts 155, 156, also form the coupling by which the part 155 rotates the part 156. Said part 156 is retained in the bore of the boss 86 by means of a ring-shaped retaining plate 164 secured flush against the end of the boss 86 and overlapping the end of said part 156. Said part 156, through the spacing pegs 157 holds the part 155 against the end of the trunnion 80.

It will be seen that the location of the retaining plate 164 is effected by the co-operation of three arcuate slots 165 formed in said plate with three headed posts 166 projecting from the end face of the boss 86. Each slot 165 is enlarged at one end to a size capable of admitting the head of a post 166 but throughout the remainder of its length it is only wide enough to admit the stem of a post. To secure said retaining plate 164 therefore all that is necessary is to pass the enlarged ends of the slots 165 over the heads of the posts 166 and give the plate a turn so that the other ends of the slots accommodate the posts. A reverse operation effects removal of said retaining plate, and thus the die 155, 156 can be readily removed and supplanted by another when a bar 1 of different section is to be dealt with.

The reference 167 designates a spring loaded stud mounted on the end of the boss 86 and adapted to engage, under its bias, in a small hole 168 when the retaining plate 164 is at its secured position. This prevents inadvertent removal of said retaining plate. To remove said retaining plate said stud must first be pressed inwards by means of a suitable implement, against its bias, out of engagement with the hole 168.

Referring now to Figures 12, 13, 14 and 15, these figures illustrate a somewhat different form of conveying unit which is distinguished from that of Figures 2 and 3 firstly in that, instead of one roller 17 having its axis fixed in relation to the carrier structure and the other having its axis biased towards the first roller, both rollers 17 have their axes biased relatively to the carrier structure towards each other. Secondly the means for limiting the gap between the two rollers is operable from outside the compartment.

The general operation is the same as that of the construction of Figures 2 and 3. The rollers 17 are mounted in a carrier structure 169 which is rotatable bodily about the axis of the bar 1, and, in response to such rotation, the rollers rotate about their own axes to feed the bar which is thus simultaneously fed and rotated. Thus said carrier structure is mounted on the face of a rotatable sprocket wheel 170 which is equivalent to the sprocket wheel 25 of Figures 2 and 3 and is driven by a chain drive from the prime mover. Coaxial with said sprocket wheel 170 and close thereto on the side opposite to the structure 169 is a relatively small fixed sun gear wheel 171. Rotatably mounted on the face of said sprocket wheel is a planet gear wheel 172 in mesh with said sun gear wheel. The shaft 173 of said planet gear wheel 172 is a worm shaft rotatably mounted on the carrier structure 169 and has fast on it a worm 174 which is in mesh with a worm wheel 175 mounted on a common drive shaft 176 with which it is fixed in respect of rotation. The rollers 17 are fast on respective shafts 177 and 178 which are carried by the carrier structure 169, and said shafts are driven from said common drive shaft 176 through respective pairs of bevel gears 179, 180 and 181, 182.

Said carrier structure 169 comprises a main casting 183 which is secured rigidly against the face of the sprocket wheel 170. This main casting 183 comprises a bridge-shaped portion, as will be clear from the drawings, and, housed beneath said bridge shaped portion are two auxiliary castings 184 and 185. These auxiliary castings carry the bearings for the shafts 177 and 178 of the rollers 17, and they are mounted on the face of the sprocket wheel 170 in such a way as to be slidable in the direction to bring said rollers nearer to or further from each other.

The axis of the worm shaft 173 must of course be fixed in relation to the sprocket wheel 170, and this shaft runs in bearings carried by said sprocket wheel and by the main casting 183. The common drive shaft 176 bears in four bearings, viz. ball bearings at 186 and 187 in the main casting 183, a ball bearing 188 in the auxiliary casting 185 and a ball bearing 189 in the auxiliary casting 186. The ball bearings at 186 and 187 are ordinary ball bearings by which said shaft 176 is retained against axial movement. The ball bearings 188 and 189 have their inner races in splined relation to said shaft 176, and thus, as the castings 184 and 185 make their sliding movement said ball bearings 189 and 188 are able to slide with said castings along said shaft 176.

The bevel gears 179 and 181 are also capable of sliding relative to said shaft 176 so that they may move with the castings 184 and 185 and remain in mesh with the bevel gears 180 and 182, and to this end said bevel gears 179 and 181 are formed with elongated bosses 190 and 191 which are keyed on to said shaft 176 so as to be capable of axial movement thereon. Said bosses at their ends remote from the bevel gears abut against the ball races of the ball bearings 189 and 188, and thus said bosses and their bevel gears 179 and 181 are constrained to move axially with the castings 184 and 185. Thus the rollers 17 are able to make their movements towards and away from each other without their power transmission trains being affected.

The worm 174 and the worm wheel 175 are enclosed in an enclosure 192 formed on the main casting 183. The bevel gears 181 and 182 are enclosed in an enclosure 193 formed on the auxiliary casting 185 and the bevel gears 179 and 180 are enclosed in an enclosure 194 formed on the auxiliary casting 184. The bearings of the shaft 173 are provided with means to keep outside dust from the enclosure 192, and the bearings 189 and 188 are likewise provided with means to keep dust from the enclosures 193 and 194. It will be seen that the shaft 176 passes at places other than the said bearings through walls of the enclosures 193 and 194. The references 195 and 196 designate glands to prevent dust from entering said enclosures at the said places.

For slidably mounting the castings 184 and 185 on the sprocket wheel 170 as stated, two parallel guide elements 197 are mounted on the face of said sprocket wheel, and said castings are located so as to slide between said guide elements. Said guide elements are of angle section and said castings are formed with flanges which engage with said guide elements in such a way that castings are held against the face of said sprocket wheel.

For biasing said castings 184 and 185 (and therefore the rollers 17) towards one another heavy compression springs 198 are provided. Each of these, as will be readily seen from the drawing is in compression between a respective one of the castings 184, 185 and a respective wall of the main casting 183.

The rotatable mounting of the unit comprising the sprocket 170 and main casting 183 is effected in substantially the same way as the rotatable mounting of the unit comprising the sprocket 25 and main carrier structure portion 18 of Figures 2 and 3 and need not therefore be described in much detail. Thus the sprocket 187 has a trunnion secured rigidly to it, which runs in a bearing within a boss element or housing 199 which is mounted in the partition 84. In like manner the main casting 183 has a trunnion 200 secured rigidly to it, which runs in a bearing in a boss element or housing 201 which is mounted in the partition 85. The air flow arrangement for keeping dust and the like from the compartment 5 is the same as in Figures 2 and 3, and the reference 197 designates similar air supply pipes to those similarly designated in Figures 2 and 3. Also, in equivalent manner to said preceding embodiment, the sun gear wheel 171 is rotatably mounted on the boss element 199, and is fast with a ratchet wheel 202, and mechanism 88, 90, 91, 92, 94, 95 is provided, equivalent to the similarly designated mechanism of Figures 2 and 3, for normally retaining said ratchet wheel 202 and sun wheel 171 stationary, said mechanism being operable at will for permitting said ratchet wheel and sun wheel to rotate and thereby stop the forward feed of the bar 1.

Describing now the means for limiting the gap between the two rollers 17, a ring-shaped element 203 is fixedly mounted on the inner surface of the partition 85 so as to surround the boss element 201. Rotatably mounted on said element 203 through ball bearings 204 is an internally screwed nut 205. In screwed engagement within said nut 205 is a ring 206, and said ring has projections 207 which engage in holes in the partition 85 so as to prevent said ring from rotating while permitting it to move axially. Mounted within said ring 206, in ball bearings 208, so as to be rotatable but not axially movable relative to said ring, is an inner ring 209, and this inner ring is formed with two diametrically opposite projections 210 which project parallel to the axis of rotation of the sprocket wheel 170 and associated parts, and each of which extends between rollers 211 carried by the castings 184 and 185. Thus said projections 210 form the means for limiting the gap between the roller 17.

The nut 205 has its outer periphery formed with worm wheel teeth, and a worm 212, fast on a shaft 213 which rotates in fixed bearings, engages said worm wheel teeth. Said shaft 213 passes through the front wall 214 of the compartment 5 and is rotatable by means of a handle 215 outside said compartment. It will therefore be seen that, by rotating said handle 215 the nut 205 will be rotated. This will effect axial movement of the ring 206 and therefore of the inner ring 209 and its projections 209. It will be seen that said inner ring and projections are free to rotate with the whole carrier structure about the axis of the bar 1.

As clearly shown said projections 209 are wedge-shaped, so that the limit of the gap between the rollers 17 is varied by the longitudinal movement of said projections. Thus by rotating the handle 215 the limit of said gap is adjusted.

The handle 215 has an associated toothed pinion 216, and this is in mesh with a gear wheel 217. Said gear wheel 217 rotates relative to a fixed fiduciary pointer 218 and is calibrated, as in the case of the equivalent toothed wheel 73 of Figures 2 and 3, in terms of the thickness of the flange of the bar 1 which the rollers 17 are to take.

It is clear that the device just described for limiting the gap between the two rollers 17 could be equally well applied to the construction of Figures 2 and 3. In that case wedge elements corresponding to the elements 210 would be inserted between rollers on the main part and the auxiliary part of the carrier structure.

Returning now to Figure 1 the whole of the mechanism heretofore described is driven by means of an electric motor 231 which, through a gear box 232 drives a horizontal shaft 233 which extends the length of the set of compartments 5, 2, 5, 3, 5, 4, 5 and underneath them. This shaft 233 carries sprockets 234 and 235 which through the aforesaid chain-drives 24 and 126 drive the conveying units and the rocking mechanism for the spray guns. Another sprocket 236 on said shaft 233 drives, through a chain 237, the pump 12 for the passivating apparatus in the compartment 4.

The reference 238 designates an electric motor for driving the abrator wheel 6. The overhead apparatus which is employed in connection with the wheel abrator, and which is designated generally by the reference 239, is well known and will not be further described. The same applies to the underground receptacle for the same, designated by the reference 240.

The reference 241 designates a chimney leading from the metallising chamber 3, and the reference 242 glazed inspection windows for the several treatment chambers 2, 3, 4. It will be seen that the metallising chamber 3 underneath the window 242 is open to give easy access to the spray guns 7 and to afford ingress to the wires 9 and the compressed gas tubes.

The scope of this invention is not limited to the treatment of angle, T and flat sections of bar steel since by suitably altering the shape of the apertures through which the bar is fed and arranging the position of the rollers round or square bars and also channel or I joist sections or plates or sheets can be similarly treated by this invention.

In cases where very heavy girders are to be treated, it may be convenient to arrange instead of the trolleys 21, additional conveying units of the type described, but without air seals, spaced at suitable intervals at each end of the apparatus. These can be revolved by extensions from the main drive shaft 233 and fitted with clutches so that, when stationary the heavy bar or girder can be loaded into them and by engaging the clutch, the conveyor units will turn and propel the girders into the machine. These conveyor units would of course be supported on springs in a similar manner to the trolleys 21, whereby any lack of straightness of the girder is accommodated.

We claim:

1. Apparatus for applying metal coatings to bars, comprising a chamber, means for passing a bar longitudinally through said chamber and at the same time rotating it about its axis, a spray gun in said chamber adapted to spray the surface of such bar as the latter passes through said chamber, and means rocking the gun to and fro in synchronism with the rotation of such bar as it is passed through the chamber.

2. Apparatus for treating the surface of bars, comprising two adjacent chambers, a partition separating said chambers and having a circular aperture therein, a circular element which is rotatable in said aperture and forms a rotating seal therein, an opening through said circular element, said opening conforming to the section of a bar and enabling such bar to pass through it from chamber to chamber, means for passing such bar longitudinally through said opening and at the same time rotating such bar and said circular element about the longitudinal axis of such bar, and means for causing air to flow from said opening into one of said chambers for preventing the passage of matter from said one chamber into the other chamber through said opening.

3. Apparatus for applying metal coatings to bars, comprising a chamber, means for passing a bar longitudinally through said chamber and at the same time rotating such bar about its longitudinal axis, a plurality of cams in said chamber, said cams being located at intervals along the line of such bar and having openings to enable such bar to pass through them, means for rotating said cams synchronously with such bar about said longitudinal axis, a rockable shaft in said chamber parallel to such bar, a spray gun mounted on said shaft to rock therewith and adapted to spray such bar as the latter passes through said chamber, an arm fast on said shaft, and a roller mounted on said arm and capable of being adjusted in a direction parallel to said shaft so as to engage a selected one of said cams so that said selected cam effects the rocking of said shaft and said spray gun, whereby said spray gun can be rocked according to different time-angle characteristics to suit different sections of bar.

4. Apparatus for applying metal coatings to bars and the like, comprising a plurality of contiguous aligned chambers including a bar cleaning chamber and a succeeding bar coating chamber, means for passing a bar longitudinally through said contiguous aligned chambers successively, said bar passing means providing an operative path for bar movement, abrasive blast apparatus in said bar cleaning chamber positioned to abrasively clean a bar passing therethrough, and spraying apparatus in the succeeding bar coating chamber positioned to spray coat a bar passing therethrough, the contiguous relationship of the chambers serving to reduce contamination of a cleaned but uncoated bar surface.

5. Apparatus as defined in claim 4 having in addition bar rotating means adapted to rotate a bar about its longitudinal axis.

6. Apparatus as defined in claim 4 wherein a spraying apparatus is disposed in a second spray coating chamber positioned from the first spray coating chamber on a side opposite from said bar cleaning chamber.

7. Apparatus as defined in claim 4 wherein the spray coating chamber is separated from the bar cleaning chamber by partition means having a restricted bar-passage opening in alignment with the operative path of said bar passing means and further comprising air stream producing means adapted to move air from said restricted opening into the bar cleaning chamber, whereby escape of abradant from the bar cleaning chamber may be reduced.

8. Apparatus as defined in claim 4 further comprising an intermediate chamber aligned with and separating the bar cleaning and spray coating chambers, a first partition between said bar cleaning chamber and said intermediate chamber, a second partition between said intermediate chamber and said spray coating chamber, a restricted opening in each of said partitions aligned with the operative path of said bar passing means, a first air flow producing means disposed to promote a stream of air into said bar cleaning chamber from the restricted opening in said first partition, and a second air flow producing means disposed to promote a stream of air into said spray coating chamber from the restricted opening in said second partition.

9. Apparatus as defined in claim 8 wherein said bar passing means is disposed within said intermediate chamber.

10. Apparatus as defined in claim 7 wherein said partition having a restricted opening comprises a rotatable element shaped to provide said restricted opening disposed centrally thereof, said apparatus further comprising bar rotating means adapted for rotating a bar about its longitudinal axis.

11. Apparatus as defined in claim 5 wherein said bar passing means and said bar rotating means together comprise longitudinal bar feed rollers, a bodily rotatable carrier structure mounting said longitudinal bar feed rollers and rotatable about its own axis, a prime mover for rotating the carrier, and transmission gearing adapted to rotate said longitudinal bar feed rollers in response to rotation of said carrier structure.

12. Apparatus as defined in claim 6 wherein said second spray coating chamber is a passivating chamber and contains apparatus comprising an annular spray head aligned to surround the operative path of the bar passing means, said spraying head having spraying perforations directed toward said path, means for forcing a passivating liquid into said spraying head, a passivating liquid outlet valve providing egress to said liquid from the spraying head and actuated in response to the pressure of passivating liquid.

13. Apparatus for applying metal coatings to bars comprising a series of seven aligned contiguous chambers, said chambers comprising successively a first conveying chamber, a bar cleaning chamber, a second conveying chamber, a metallizing chamber, a third conveying chamber, a passivating chamber, and a fourth conveying chamber, longitudinal conveying apparatus in each conveying chamber provided with means for passing an elongated bar longitudinally therethrough on a path extending continuously through the series of chambers, abrasive blast apparatus in said bar cleaning chamber spaced from said path and positioned to abrasively clean a bar passing therealong, metal spraying apparatus in said metallizing chamber spaced from said path and positioned to spray coat a bar passing therealong, and passivating apparatus in said passivating chamber spaced from said path and positioned to spray coat a bar passing therealong.

14. Apparatus for treating the surface of bars comprising an abrading chamber, an adjacent conveyor chamber, and a partition separating said chambers, said partition having a circular aperture therein, a circular die disposed in said aperture and rotatable therein forming a rotating seal therein, a bar passage opening through said circular die, said die and said partition formed to constitute therebetween a closed circumferential channel, said partition having a port leading to said circumferential channel, said die having a port leading from said circumferential channel to said opening, means in said conveyor chamber for passing a bar through said opening and longitudinally through said abrading and conveyor chambers successively, said bar passing means including means for rotating a passing bar about its longitudinal axis and means for rotating said die about said axis, abrasive blast apparatus in said abrading chamber positioned to abrasively clean a bar passing therethrough and means for blowing air through said first-named port into said circumferential channel and thence through said second-named port to said opening and thence into said abrading chamber, said die being detachable from said bar passing means.

15. Apparatus as defined in claim 1 further comprising a spray gun rocking means adjusting assembly for varying the rocking motion in accordance with different time-angle characteristics.

16. Apparatus as defined in claim 2 wherein said circular element and said partition are formed to constitute a closed circumferential channel between them, said partition has a port in it leading to said circumferential channel, said circular element has a port in it leading from said circumferential channel to said opening, and the means for causing air to flow from said opening includes means for blowing air through said first-named port into said circumferential channel and thence through said second-named port to said opening and thence into one of said chambers.

17. Apparatus as defied in claim 2 wherein said circular element consists of two coaxial die portions namely a first die portion having its surface which is towards one of said chambers convexly coned and a second die portion on the side of said first die portion towards said one chamber having its surface towards said first die portion concavely coned, so that a narrow conical clearance exists between said two coned surfaces which clearance converges towards said one chamber and intersects said opening, said partition having a port in it leading to said conical clearance, and said means for causing air to flow from said opening comprises means for blowing air through said port to said conical clearance and thence into said one chamber.

18. In an apparatus for surface treating elongated metal bars and the like which are moved longitudinally through successive treating chambers and simultaneously rotated on their longitudinal axes, a partition wall separating adjacent chambers and having a circular aperture, a die member lying within the aperture substantially in the plane of said partition, said die member having a centrally located bar-passage opening and driving means engaged with said die member for rotating the latter within said partition aperture.

19. Apparatus for abrasively cleaning elongated metal bars and the like which are moved longitudinally through a chamber and simultaneously rotated on their longitudinal axes, said apparatus comprising a chamber having opposing end walls, means within the chamber for applying an abrasive cleaning blast against the surface of a bar passing through the chamber, a pair of aligned bar-passage openings in the end walls of the chamber, and blowing means for directing air from the bar-passage openings inwardly to within the chamber whereby egress through said openings of particulate material within the chamber may be substantially prevented.

20. Apparatus for spray coating an elongated metal bar or the like comprising means for advancing the bar longitudinally and simultaneously rotating it about its longitudinal axis, means for directing a spray onto the surface of the bar, and means for rocking the spraying means synchronously with bar rotation whereby spray is directed against all portions of the bar surface.

HAROLD WILMOT.
CHARLES ST. VINCENT SMITH.

REFERENCES CITED

The following references are of record in the file of this patent:

UNITED STATES PATENTS

| Number | Name | Date |
|---|---|---|
| 1,643,330 | Barord | Sept. 27, 1927 |
| 1,887,434 | Sammis | Nov. 8, 1932 |
| 2,038,204 | Bidle | Apr. 21, 1936 |
| 2,203,606 | Whitfield et al. | June 4, 1940 |
| 2,282,628 | Whann et al. | May 12, 1942 |
| 2,302,196 | Downs et al. | Nov. 17, 1942 |
| 2,336,533 | Dilworth | Dec. 14, 1943 |
| 2,390,007 | Sherman | Nov. 27, 1945 |
| 2,414,923 | Batcheller | Jan. 28, 1947 |
| 2,442,485 | Cook | June 1, 1948 |